Figure 1:
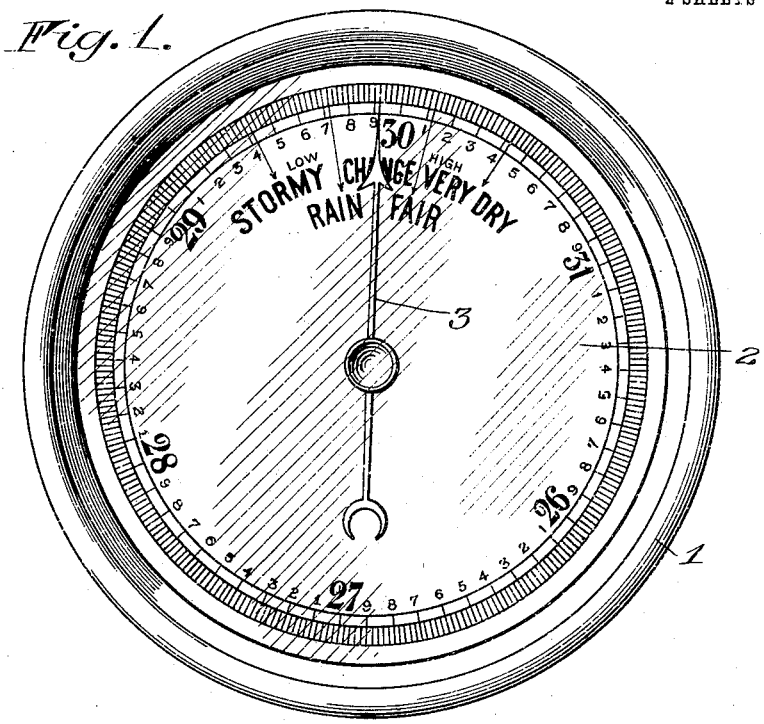

F. E. COLLINSON.
BAROMETER.
APPLICATION FILED OCT. 16, 1911.

1,107,496.

Patented Aug. 18, 1914.

2 SHEETS—SHEET 1.

Witnesses
Walter B. Payne
H. E. Stonebraker

Inventor
Francis E. Collinson
By Church & Rich
his Attorneys

F. E. COLLINSON.
BAROMETER.
APPLICATION FILED OCT. 16, 1911.
1,107,496.
Patented Aug. 18, 1914.
2 SHEETS—SHEET 2.
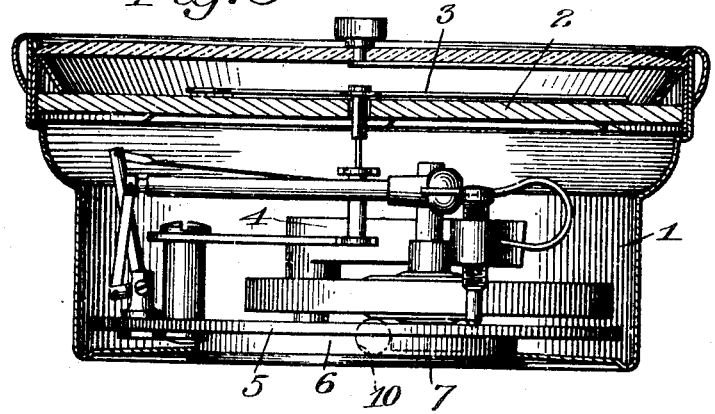
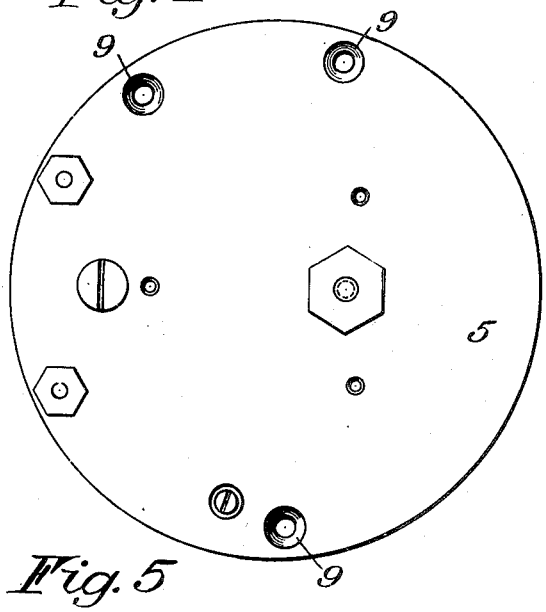
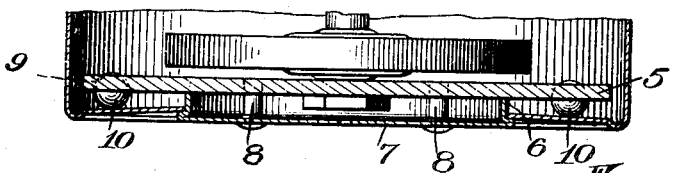
Inventor
Francis E. Collinson

UNITED STATES PATENT OFFICE.

FRANCIS E. COLLINSON, OF WALTHAMSTOW, LONDON, ENGLAND, ASSIGNOR OF ONE-HALF TO TAYLOR INSTRUMENT COMPANIES, OF ROCHESTER, NEW YORK, A CORPORATION OF NEW YORK.

BAROMETER.

1,107,496.

Specification of Letters Patent. Patented Aug. 18, 1914.

Application filed October 16, 1911. Serial No. 654,835.

*To all whom it may concern:*

Be it known that I, FRANCIS E. COLLINSON, of Walthamstow, London, N. E., England, have invented certain new and useful Improvements in Barometers; and I do hereby declare the following to be a full, clear, and exact description of the same, reference being had to the accompanying drawings, forming a part of this specification, and to the reference numerals marked thereon.

The present invention related to barometers, being designed especially for the type known as aneroid barometers, and it has for its object the provision of a barometer of simple construction, which will give an easily determinable weather forecast for a substantial period of time in advance.

A further object of my invention is to provide a barometer which can be readily corrected or adjusted to any altitude, so as to give a correct reading at any point, corresponding to the reading if the instrument were positioned at sea level.

To these and other ends the invention consists in certain improvements and combinations of parts all as will be hereinafter more fully described, the novel features being pointed out in the claims at the end of the specification.

Figure 2:
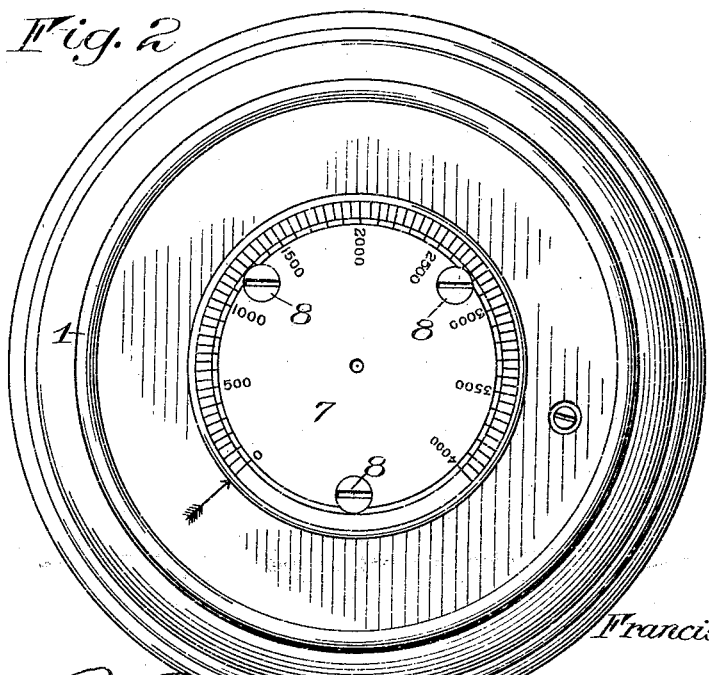

In the drawings: Figure 1 is a top plan view of a barometer constructed in accordance with one embodiment of the present invention; Fig. 2 is a bottom plan view of the same; Fig. 3 is a vertical sectional view; Fig. 4 is a view in elevation of the support or base plate on which is mounted the atmospherically controlled mechanism; and Fig. 5 is a detailed sectional view of the support, or base plate, and the means for positioning the same.

Similar reference numerals throughout the several views indicate the same parts.

According to a preferred embodiment of the invention, as herein shown and described, the structure includes a casing 1 which carries a stationary indicating scale, preferably comprising a dial 2 which is fixed in any suitable manner to the casing, and is provided on its upper surface with proper graduations, and other data, for indicating a change in the weather, as will be described hereinafter.

Arranged for coöperation with the dial 2 is an indicator, or hand 3, which is operatively connected to the atmospherically controlled mechanism 4, and arranged to be moved thereby in accordance with the changes in atmospheric conditions, all as is well known in this art. Since the atmospherically controlled mechanism, of itself, constitutes no part of the present invention, and may be of any well known construction, it will not be necessary to describe the same in detail in the present application.

The atmospherically controlled mechanism 4 is suitably mounted on a support, which preferably comprises a base plate 5, the same being adjustably mounted within the casing, as will now be described. The bottom of the casing 1 is provided with a centrally disposed opening arranged to receive the flange 6 formed on the altitude indicating dial 7, the latter being attached to the base plate 5 in any suitable manner, as by means of the attaching screws 8. In order to afford proper frictional engagement between the relatively moving parts, and, at the same time, to obviate unnecessary binding, suitable openings 9 are provided in the base plate 5 and arranged to receive the ball bearings 10, the latter being supported by the casing, as shown clearly in Fig. 5. When the altitude indicating dial 7 is properly secured to the base plate 5, the latter is frictionally held in any adjusted position, but may be turned within the casing by a slight pressure upon the altitude indicating dial.

The altitude indicating dial 7 constitutes a preferred means for adjusting the barometer to any desired altitude, so as to give a reading correct at sea level, and to this end, it is provided with a series of indicating marks, which in the present embodiment correspond to any altitude up to four thousand feet. The divisions on the dial are adapted to register with a predetermined stationary mark on the casing, and are properly arranged so as to agree with the standards for reducing different altitudes to sea level, so that a movement of the altitude indicator from zero to one thousand will result in moving the indicator, or hand 3, a distance of 1.08 inches on the indicating scale; a movement from one thousand to two thousand effecting movement of the hand a distance of 1.04 inches; and movement of the dial from two thousand to three thousand effecting a movement of the hand a distance of one inch, etc. By this means I provide a sea level barometer which is instantaneously adjustable to any altitude for which it is constructed, and in a manner to agree correctly with the United States Weather Bureau standard sea level reading. Obviously, the device may readily be adapted for higher altitudes than disclosed in the present embodiment.

The dial 2 is preferably provided with proper data to indicate changes of the weather in advance, such result being obtained by the proper arrangement of the words Low and High, Rain and Fair, Stormy, Change and Very dry, in proper relation to the normal position of the indicator, so that from this construction one is enabled, with substantial exactness, to forecast the weather conditions for a period of about thirty-six hours in advance, and in a most ready manner, without any mathematical calculations, and by merely observing the indicating scale.

I claim as my invention:

1. In a barometer, the combination with a circular indicating scale, of a rotary indicator coöperating with said scale, atmospherically controlled mechanism for effecting movement of the indicator, said mechanism and said indicator being rotatable relatively to the indicating scale and independently of the action of the atmosphere upon the atmospherically controlled mechanism.

2. In a barometer, the combination with a casing and a circular indicating scale carried thereby, of a support rotatably mounted within the casing, atmospherically controlled mechanism mounted on said support, and a rotary indicator adapted to be removed by said mechanism and arranged for coöperation with the indicating scale.

3. In a barometer, the combination with a casing and a circular indicating scale carried thereby, of a base plate rotatably mounted in the casing and coöperating with a stationary indication on the casing to correct the reading for different altitudes, atmospherically controlled mechanism mounted on said base plate, and a rotary indicator adapted to be moved by said mechanism and arranged for coöperation with the indicating scale.

4. In a barometer, the combination with a casing and an indicating scale carried thereby, of a base plate rotatably mounted in the casing, atmospherically controlled mechanism mounted on said base plate, an indicator adapted to be moved by said mechanism and arranged for coöperation with the indicating scale, and an altitude indicating dial carried by the base plate and adapted to coöperate with an indicator on the casing.

FRANCIS E. COLLINSON.

Witnesses:
C. P. Liddon,
R. M. Meams.